US005424770A

United States Patent [19]

Schmelzer et al.

[11] Patent Number: 5,424,770

[45] Date of Patent: Jun. 13, 1995

[54] METHOD AND APPARATUS FOR AUTOMATIC INSERTION OF A TELEVISION SIGNAL FROM A REMOTE SOURCE

[75] Inventors: Richard A. Schmelzer, Boulder, Colo.; Trevor Lambert, Sherborn, Mass.

[73] Assignee: Cable Service Technologies, Inc., Boulder, Colo.

[21] Appl. No.: 305,312

[22] Filed: Sep. 15, 1994

Related U.S. Application Data

[63] Continuation of Ser. No. 46,959, Apr. 16, 1993, abandoned.

[51] Int. Cl.[6] .............................................. H04N 7/10

[52] U.S. Cl. ......................................... 348/9; 455/3.2; 455/4.1; 348/705

[58] Field of Search .................. 358/86, 181; 455/3.1, 455/4.1, 3.2, 7, 18; 348/6, 7, 8, 9, 705, 706; H04N 7/10, 7/16, 7/167, 7/173, 1/00, 5/262, 5/268, 7/20

[56] References Cited

U.S. PATENT DOCUMENTS 3,696,297 10/1972 Otero .
4,331,974 5/1982 Cogswell et al. .
4,532,547 7/1985 Bennett .
4,538,174 8/1985 Gargini et al. .
4,547,804 10/1985 Greenberg .
4,575,750 3/1986 Callahan .
4,625,235 11/1986 Watson .
4,638,181 1/1987 Deiss .
4,638,359 1/1987 Watson .
4,639,779 1/1987 Greenberg .
4,647,964 3/1987 Weinblatt .
4,656,629 4/1987 Kondoh et al. .
4,724,491 2/1988 Lambert .
4,733,301 3/1988 Wright, Jr. .
4,814,883 3/1989 Perine et al. .
4,887,152 12/1989 Matsuzaki et al. .
5,029,232 7/1991 Nall .
5,099,319 3/1992 Esch et al. .
5,130,792 7/1992 Tindell et al. .
5,200,825 4/1993 Perine .

FOREIGN PATENT DOCUMENTS 0187961 7/1986 European Pat. Off. .
0355697 2/1990 European Pat. Off. .
0424648 5/1991 European Pat. Off. .
0482801 4/1992 European Pat. Off. ....... H04N 1/00
0536628 4/1993 European Pat. Off. .
9221206 11/1992 WIPO .

OTHER PUBLICATIONS

Arvis 7000 and 7742 Brochures.
Multichannel News, Feb. 17, 1992 "Adstar and Nustar Take Vows".
S. Schley, Cable Avails, "Spot Cable", Apr. 1993.
Abstract "CM Transmission Device" NEC Corp.
7609 Sat-A-Dat Decoder/Controller, Group W Brochure.

*Primary Examiner*—James J. Groody
*Assistant Examiner*—David E. Harvey
*Attorney, Agent, or Firm*—Myers, Liniak & Berenato

[57] ABSTRACT

A system is provided for inserting selected commercials from a remote source via satellite into pre-cued cable network commercial breaks at targeted regional groupings of local cable headend operators without storage of the commercials at each headend. By sequencing the avails used for insertion among the groupings of headends, by creating plural levels of simultaneity, and by using compression/decompression techniques, a highly efficient use of the satellite per each transponder channel is achieved despite overlap in breaks as between networks; while, at the same time, allowing sufficient time during each break for the local headend operator to insert his own local ads if desired, and to use as well, if desired, the decompression capabilities of the system without the need for the headend to invest in its own.

31 Claims, 7 Drawing Sheets

(CNN, ESPN, etc. 242, 244, 246, 248 etc.)
10
11
(CNN, ESPN etc. 242, 244, 246, 248 etc.)
93
1
95
91A
90
50 52 54 56
70
74
76
58 60 62 64
72
78
80
250
22
502
91B
500
504
100 102
104 106
252B
252C
108
120 122 124 126
110
128 130 132 134

18(D)
16(C)
14(B)
12(A)
22
250
11
10
3(2, 2a,b)
1
95

CNN, ESPN, etc.
242, 244, 246, 248 etc.
93
91A
1
50
52
54
56
58
60
62
64
70
72
74
76
78
80
90
95
10
11
CNN, ESPN etc.
242, 244, 246,
248 etc.
250
22
500
502
504
100
102
104
106
108
110
91B
252B
252C
120
122
124
126
128
130
132
134

360
321
357
340
344
252A
TO 74
FROM 252A
314
316
317
318
319
308
310a
310b
310c
310d
310e
310f
310g
310h
310i
310j
310k
310L
310m
310n
310"o"
310"p"
74
76
78
80
90
3
50
52
54
56
58
60
62
64

METHOD AND APPARATUS FOR AUTOMATIC INSERTION OF A TELEVISION SIGNAL FROM A REMOTE SOURCE

This is a continuation of application Ser. No. 08/046,959 filed Apr. 16, 1993, now abandoned.

FIELD OF THE INVENTION

This invention relates to apparatus and methods for automatically inserting a television signal from a remote source into a plurality of local cable television broadcasts. More particularly, the invention is directed to a method and apparatus for inserting pre-recorded television commercials from a remote central site into local cable television broadcasts in several designated geographic areas.

BACKGROUND OF THE INVENTION

At present, cable television networks are broadcast over satellite communications. A cable network, such as Cable News Network (CNN), will provide programming, cable network commercials and air time cued by a preceding signal during which the local cable service providers are allowed to insert their own commercial spots. The cable network signal, including the cue tone, is transmitted to the local cable service providers via satellite by transmitting the cable network signal up to a satellite transponder that then transmits the signal back down to the earth's surface over a downlink. The downlink covers a large geographic area. There are usually many local cable service providers in the geographic area of the downlink.

The local cable television service providers receive the signal from the satellite transponder over the downlink. Each of these cable service providers is usually referred to as a cable "headend". In the usual situation a plurality of cable headends are grouped geographically for advertising purposes, and such groupings have become known as Designated Market Areas or DMA's.

Each of these cable headends receives a number of cable network signals such as CNN, the Music Television Channel (MTV), the Sports Network (ESPN) and many others, usually through the use of multiple dedicated satellite dishes. The time made available for insertion of messages may be referred to as "breaks". These breaks need not be used in their entirety. The time used may be referred to as an "avail", and this terminology is adopted for use herein. These "avails" may occur during the networks' commercial "breaks" at a time when a particular network may be running its own commercials capable of being electronically preempted by the insertions, or the network may leave blank air time for the insertions. Typical "avails" are for 30 seconds and there may be two or more "avails" within a "break" which may be of 1 or 2 minutes in duration.

In order to insert advertising into a network cued "break", cable headend operators have employed automation equipment that controls video tape players and positions the "local" spot advertisement(s) or other messages for playback and insertion when cued at the proper time. However, the local headend operator may not be able to fill the entire "break" with economically desirable advertising. Thus a market is created for the headend operator to sell additional, more economically desirable advertising to be inserted. An example of this is a national company's advertisement that is targeted for only regional or semi-regional distribution (e.g. what McDonald's may wish to advertise in New York City, it may not wish to advertise in Dallas, Tex.). The "region" to be targeted may often consist of a group of cooperative cable companies who happen to be in a designated marketing area (DMA) or a zone within a DMA.

An advertiser today who wishes to advertise regionally or semi-regionally using the present, most prevalent technology must contact each local cable service headend or a designated advertising representative for a group of headends, arrange for each headend to have a taped copy of the ad, and then maker contact with each headend to show the commercial during a desired series of avails over a desired selection of cable channels. This arrangement has been very difficult to establish, coordinate and operate. A national or regional advertiser seeking to reach a target audience in a particular DMA or zone within a DMA will often not undertake the task of entering into such cumbersome arrangements with so many parties. National advertisers have therefore sought out simpler arrangements made directly with network television broadcasters such as NBC, ABC and CBS, or with the cable networks that cover the entire country and are priced accordingly. Both the national advertiser and individual headend operator, in short, suffer due to the inadequacies of the most prevalent technology extant.

A number of attempts in the prior art with non-real time approaches have provided a less than complete solution to the above-described problem. For example:

One known attempt at a solution, called "ADLINK", includes a system for sending to the headend operator in a DMA, from a remote central site, commercial messages over a special satellite transponder in an hour-long stream at off-hours (e.g. nighttime). The headend operators record this stream of commercials on a video tape recorder located at each headend for playback during on-hours "avails" of their choosing (e.g. daytime). This system requires all the tape recorders at all headends to operate reliably over relatively long periods of time. The national advertisers have demonstrated that they do not have confidence that their spots, in fact, are always run by each headend operator in this type of system. In addition, if even one or only a few headends fail in a targeted DMA, monitoring of the lost ad is complex and, when disclosed, it is not always practical to run the ad again free, as there may well be the same or a different headend(s) not working every night. This approach has also been offered by "AdStar" (a/k/a "NuStar" and "Starnet") with more reliable local digital video storage systems replacing the unreliable tape recorders. This newer offering, however, is expensive and requires a large investment by the cable headend operators. Even if these systems work perfectly, with no loss of commercial, affidavits of performance must still be sent by each headend to the sending source for verification. The paperwork entailed in such a process is cumbersome, expensive, and often creates payment delays.

Another known system which seeks to solve the above problem, uses a single satellite transponder to send a series of promotional messages. These messages may be inserted into the local cable headends programming whenever an "avail" occurs within a "break". Since, however, there is only one message stream and it has to serve all headends all the time, it is not sent in step with the timing of the breaks. Gaps thus inherently occur, except in an unusual or coincidental circumstance. To accomplish its purpose, then, each "avail" is conceived of as being broken up into a continuous stream of ten second messages, so that insertion can occur with some continuity. A third filler message is used to help in the 0–10 second transition period. This approach is known as the "Multivail" system and is detailed in U.S. Pat. No. 4,814,883. It is useful for cable network promotion, but has been shown not to be useful for a regional advertiser that needs full length spots and needs to select specific targeted DMA's.

Another known system used as an insertion approach recognizes that all cable networks do not run commercial breaks at the same time. This automated approach located at each headend uses a computer programmed to draw upon a pool of headend tape players as needed to complete the insertion. The video tapes contain many commercials which are laid down in a special format. Each tape player is positioned by the computer to start at the format location of the next desired commercial. This concept is known as the "ARVIS" system and is detailed in U.S. Pat. No. 4,724,491. A known extension of this approach calls for commercials to be sent over a fiber optic link by the headend operator with the computerized video tape bank, to an adjacent cable operator for insertion in its programming in order to widen the audience for the local advertising. This concept has been used, for example, in Indianapolis by two cable operators wishing to connect their systems together just for the brief duration of the commercial breaks.

In view of the above, it is apparent that there exists a need in the art for both an apparatus and method which may be used efficiently and economically to insert and verify the insertion of commercials, or other messages, into slots cued by cable networks during their programming for insertion of messages from another source, particularly where it is desirable to use at least a portion of the available time for regional advertising in a plurality of designated market areas, or zones within these DMA's.

SUMMARY OF THE INVENTION

This invention fulfills the above-described need in the art, as well as other needs apparent to the skilled artisan, once given the following disclosure, by providing an apparatus for inserting a television signal (e.g. commercial) in time sequence from a remote source into ongoing television programming being received by at least two designated areas, each area comprising at least one cable headend, the apparatus located at the remote source including: means for sensing a plurality of cue signals associated with the television programming, each said cue signal designating an upcoming time interval within which the signal from the remote source may be inserted; means responsive to said cue signals for sending an insertion signal from the remote source to a first designated area to be inserted into a time interval; and means for sending the same or different insertion signal to a second of the designated areas after completion of the insertion signal at the first designated market area. In certain embodiments each insertion signal is one-half or less of the time interval into which it is inserted.

The apparatus envisioned for use in this invention may include means for inserting the signal, e.g. commercial(s), via a satellite communications network or over fiber optic communications link or microwave landlink. In this respect, in certain preferred embodiments within the scope of this invention, the apparatus further includes switch means located at the cable headends for inserting the remote source signal into the ongoing television programming to subscribers within the designated market areas. These switch means may also include means for allowing the local cable headend operator to coordinate the insertion of local programming with the insertion of the remote source signal. In certain embodiments, where the remote source signal is compressed for transmission and then decompressed at the headend, the headend switching means allows the local headend operator to use the decompression system to decompress his own compressed local programming if desired.

Also envisioned within the scope of this invention for solving the above-described and other apparent needs in the art, is a method for inserting a signal (e.g. a television commercial) in time sequence from a remote source into ongoing television programming being received by at least two designated areas, each area comprising at least one cable headend, the steps including:

a) monitoring said television programming at the remote source and sensing at this location a plurality of cue signals associated with the television programming which designate forthcoming time intervals within which a signal from the remote source may be inserted;

b) sending in response to a cue signal, an insertion signal from the remote source to a first designated area; and c) upon completion of the running of said insertion signal in said first designated area, sending the same or different insertion signal to be inserted into the same or a different time interval by a headend at a second designated area. In certain embodiments the inserted signals are commercials and run for about one-half or less of the time interval into which they are inserted.

The term "insertion signal" as used herein is used in its broadest sense to mean any kind of message or instruction to be inserted in the ongoing programming. In the preferred embodiments, of course, the insertion signal is a commercial. In this respect, the term "commercial" is used herein in its broadest sense, as well, to designate generally the insertion of any promotional or instructional message. Such a message may take many forms, including such things as actual free enterprise, corporate advertisements (Pepsi, Coke, etc.), public service announcements, network "promos", and the like. Obviously, the invention finds its widest-spread utility in the field of corporate advertising and, as such, this constitutes the preferred type of "commercial" for the purposes of this invention.

In certain preferred embodiments of this invention there is no storage of the commercial message at the cable headends. This is accomplished at the central remote site. In certain of these preferred embodiments, furthermore, the commercials to be inserted are transmitted from a single remote central site (such as Denver for the USA) over an uplink beam to a satellite transponder. In other embodiments fiber optics could be used. The commercials are then broadcast over the satellite transponder downlink beam to cable systems in a number of separate downlink DMA's sequentially. In this way, the apparatus and methods of the present invention provide a way of inserting commercial advertising, or other messages, on cable TV networks from a central site by preempting the ongoing programming at selected remote cable headends in different areas.

In preferred embodiments of this invention a number of techniques are used to minimize the cost of the transponder system. For example, the transponder is preferably time shared among a number of geographic areas, such as New York, Washington and Chicago. Each downlink area, or Designated Market Area (DMA), is taken in a time sequence in turn. By sharing the downlink over time among a number of DMA's (or a number of differently grouped headends within a DMA, herein at times referred to as "zones") the downlink resource is used more efficiently. In one embodiment, for example, each downlink zone or DMA consumes about one-half or less of each "break", leaving the remainder for network commercials or for local ads to be inserted by the local headend cable operator (thus creating what may be referred to as a "local avail"). Then, each DMA (or zone) consumes only that fraction of the avails of which it is of the total DMA's designated to be used for insertion by the central site., For example, if four DMA's (or zones) are designated for insertion by an uplink beam from the remote source, each DMA's insert (i.e. "avail") will consume one-fourth of the total avails to be used for insertion in the sequence from the remote source. By time sharing of a satellite transponder using such a sequencing technique, multiple (e.g. four) DMA's may be accommodated and the use of the transponder resource is reduced, along with its attendant cost. In addition, of course, local insertions during a "local avail" then become available by simply making the remote "avail" about one-half or less of the total network "break". In one embodiment of sequencing, for example, the remote site system sends out a commercial to be inserted in a four "avail" sequence during two sequential "breaks" to four sequential DMA's, with one DMA following the next in a cycle that repeats every four commercial "avails". Since the "avail" is not the full "break" local ads may be inserted or the network's national ad allowed to run, in the remaining time.

Flexibility and efficiency are also achieved through a second concept called "simultaneity", by recognizing that commercial "breaks" do not occur all at the same time on all networks. In the preferred embodiments of this invention, then, simultaneity is built into the system. The central site, in this respect, sends the first insert commercial to occur on a given network (e.g. CNN) over a first transponder channel and directs this for insertion. This is called the first level of simultaneity. A second commercial is then inserted "simultaneously" (i.e. at least overlappingly in time) using another transponder channel, into another network (e.g. MTV) while the first commercial is still playing on CNN. This is called the second level of simultaneity. Upon completion of the first commercial on CNN, or first level of simultaneity, the first transponder channel is made available for another commercial to be inserted on yet another network (e.g. ESPN). In one embodiment of the invention, four insertion transponder channels are shared to insert commercials into eight cable networks in this manner. As will be explained below, additional levels of simultaneity above two, may be achieved and are contemplated for use in this invention. Additional simultaneity, of course, achieves the ability to insert simultaneous commercials into more than two network "breaks".

A third concept for achieving still additional efficiency includes the use of known video compression technology so that several audio/video channels can be created from a single transponder channel. Video compression takes advantage of the redundancy in a TV picture. The signal is digitized and computations run at high speed take out some redundant information. When the redundant information is removed, the video is said to be compressed. In one embodiment of this invention, for example, video compression of four times (i.e. 4:1 ratio) at the central site and decompression of four times at each headend site is used as a means to further conserve the transponder resource on the satellite.

In the preferred embodiments of this invention, when all three of these efficiency creating concepts are implemented together, the use of a single transponder becomes highly efficient. For example, in the instance where there are four DMA's or zones in an insertion sequence (i.e. 4:1 sequence), when there is a 2:1 level of simultaneity (i.e. number of networks to number of levels of simultaneity) and a 4:1 compression ratio employed, the "efficiency ratio" of a transponder channel is 32:1. That is to say, for example, a single transponder channel now has the capability of being used as 32 audio/video channels for inserting commercials which can be deployed into 8 networks in four sequential DMA's or zones. It is to be understood, of course, that the invention is not limited to this precise example. In this respect, eight DMA's may be serviced by using a compression ratio of 8:1. The "efficiency ratio" would then be 64 because the insertion sequence remains 4:1 because servicing of the eight DMA's is in two groups of four DMA's.

This invention will now be described in reference to certain illustrated embodiments wherein:

IN THE DRAWINGS

DETAILED DESCRIPTION OF THE INVENTION

Figure 1:
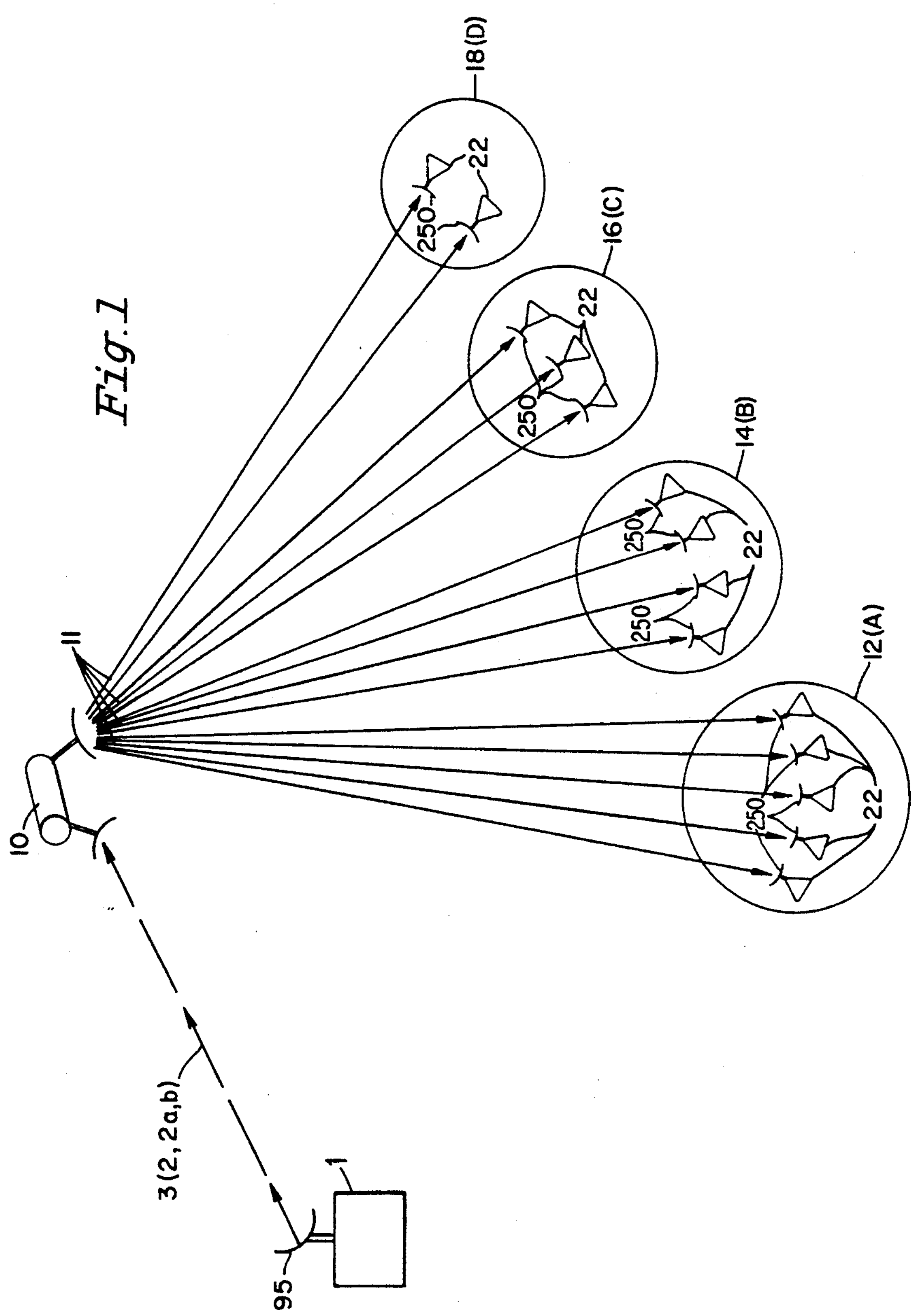
FIG. 1 is a diagrammatic illustration of a satellite communication system in accordance with this invention.

With reference to FIG. 1, the embodiment illustrated is a cable television commercial insertion system which receives a cuing signal from a cable network, such as CNN (not shown), and, in response to that cuing signal, transmits a composite signal 2, which includes a commercial insert signal **2*a*, and a control signal 2*b*, from a remote arbitrary central site 1. The commercial signal 2 to be inserted is broadcast over an uplink beam 3 via a standard satellite dish arrangement 95 to a multichannel satellite transponder 10. The satellite transponder 10 receives the uplink signals 3 and then broadcasts downlink signals 11** (uplink and downlink signals are in RF frequencies, standard in the industry).

The downlink signals 11 sent from satellite transponder 10 are grouped by coding into designated market areas (DMA's) or zones 12, 14, 16 and, 18. Preferably, these DMA's or zones are geographically separated, although they need not be. Within each DMA there may be a plurality of cable headend downlink receiver switching sites (i.e. local cable company operators) designated generally as 22. Each headend site 22 receives its signals via multiple dedicated dishes generally illustrated as item 250 (illustrated schematically as a single dish for convenience). Each of these cable headend receiving systems 22 then provides the television signals for a local cable television system sent to TV cable customers..

Figure 2:
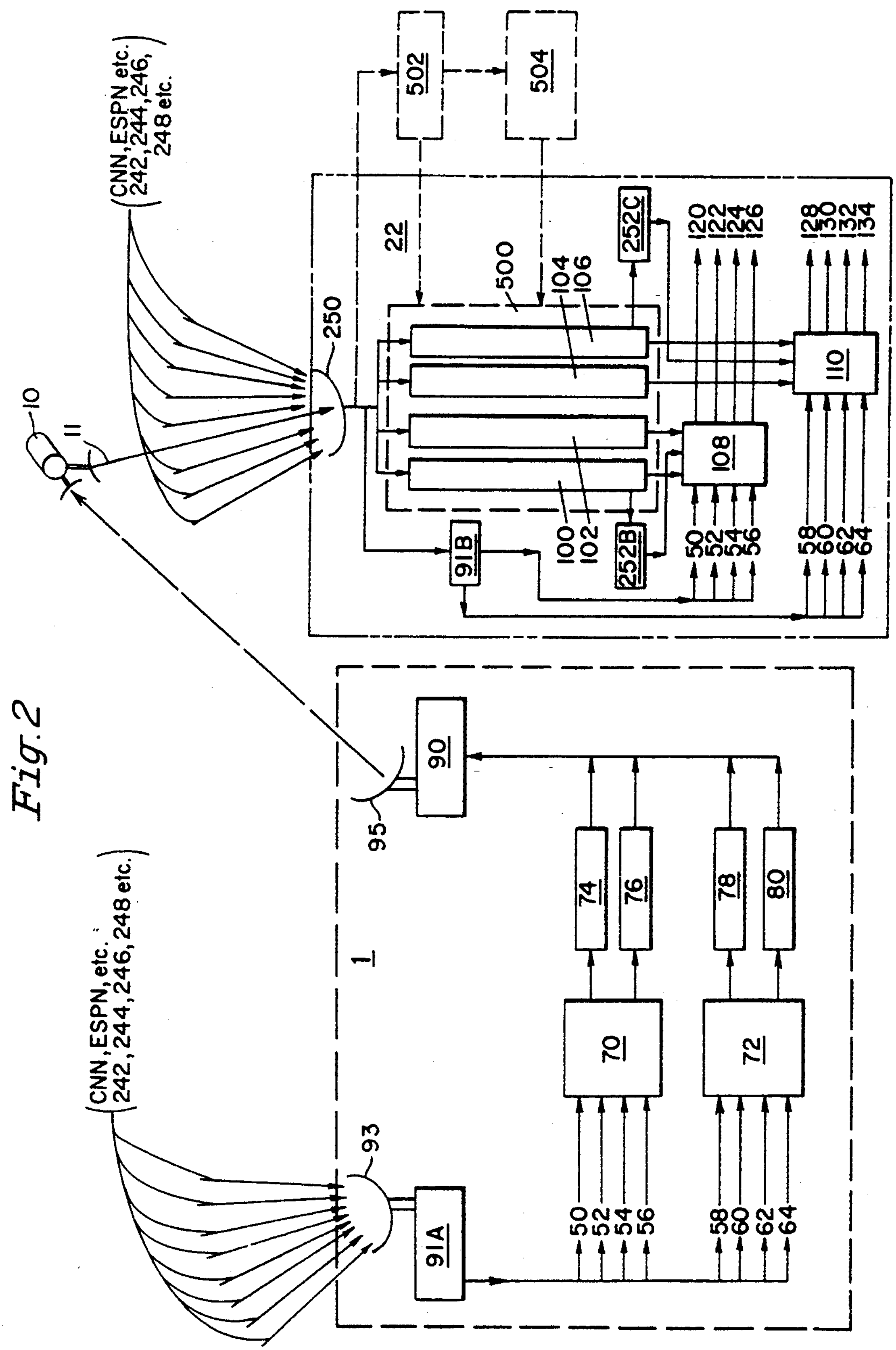
FIG. 2 is a diagram illustrating a basic television commercial insertion system as contemplated in an embodiment of this invention having video compression for the uplink signal and video decompression and control switching in the cable system.

With reference now to FIG. 2, there is first illustrated a commercial insert uplink signal source at central site 1 for generating RF frequency beam 3 in response to a number of received network television signals. These network program signals (RF signals) are received by multiple dedicated dish arrangement 93 (illustrated schematically as a single dish for convenience) in the form of RF signals 242, 244, 246, and 248 etc., totaling eight network signals in all. (It is understood, of course, that eight networks are merely exemplary. More or less networks may be serviced than eight, and such other numbers are contemplated for use in this invention.) Alternatively, these signals may be received from a fiber optic feed or microwave landlink, not shown. These network program signals received in RF frequency form are sent through conventional satellite signal receiver 91A which converts the RF frequency to the audio/video spectrum. The audio/video spectrum signals emerging are signals 50, 52, 54, 56, 58, 60 and 62.

The signals so received and converted into signals 50, 52, 54, 56, 58, 60 and 62 usually include nationally broadcast cable network programming, including their cuing signal for signalling an upcoming commercial "break". Such cuing signals usually appear as an audible or sub-audible tone in the ongoing programming. Examples of such cable network programming are: Cable News Network (CNN), ESPN, the Music Television Channel (MTV), Discovery Channel, Arts and Entertainment Channel (A&E), Nostalgia Channel (NOST), the USA Channel (USA), the Family Channel (FAM), TNT, and others. These video/audio spectrum signals are fed, in groups of four or more, into network insertion systems 70 and 72.

In response to the "break" cuing signals, the commercial insertion system 70 and 72 provides a commercial insert signal to uplink 3 from the first advertising signal encoder/compressor 74, the second advertising signal encoder/compressor 76, the third advertising signal encoder/compressor 78, and the fourth advertising signal encoder/compressor 80. The signals for each of the encoder/compressors (i.e. the commercials to be inserted) and their respective coded control now compressed, are fed into a compressed video signal generator (i.e. an RF up converter) 90 of known type for transmission over uplink beam 3 to satellite transponder 10.

An encoder/compression system useful in the practice of this invention is a four channel TDM encoder system (4 video, 16 audio) manufactured by Scientific-Atlanta, Inc., Atlanta, Ga. Such a system generally includes as the 16 channel audio system, a D9160 SEDAT Audio Encoder Chassis, D9165 Dual SEDAT Audio Encoder Cards, an appropriate computer software, as well as for the four channel video system, a D9101 single channel video encoder including an NTSC/CCIR 601 decoder/synchronizer, a D9100 multiplexer (21.5 Mbps) and a D9170 QPSK modulator (43 Mbps). There may also be provided a four channel monitoring system which includes a D9410 TDM receiver, a D9460 multi-decoder mainframe and a D9465 decoder module (21.5 Mbps). This can be used, as hereinafter described, to monitor the uplink signal being sent out for insertion.

It may also be helpful to employ a cold standby system with a 1:4 redundancy. Each 1:4 redundant system may include the appropriate number of units as in the first described unit, which may also include a 418 RF protection switch and a DEQ7-Yamaha audio delay unit, and a protection routing switcher. As used in the description of these elements, "encoder" includes the compression system, as well as the coding system; while "decoder" includes decompression as well as decoding.

The satellite transponder 10 sends the commercial insert signals and coded control instructions over downlink beam 11 to a plurality of cable system headends 22 (only one shown for convenience) in a particular downlink area or DMA (e.g. DMA 12, 14, 16, or 18; FIG. 1). It is, of course, understood in this respect, that an entire DMA need not be targeted, but that a particular DMA, for example, may be segregated into multiple "zones" for targeting. The commercial insert signals and coded control instructions are received (i.e. converted to the audio/video spectrum) and decompressed using decompression/receivers 100, 102, 104 and 106, such as an "Integrated Receiver/Decoder" Model 9708 distributed by Scientific-Atlanta, Inc..

An alternative to the use of decompression/receivers 100–106 is shown in dotted line form in FIG. 2. In this alternative embodiment, a series of decompression/-receivers generally indicated by the box 500 which is constructed in a similar fashion to decompression/-receivers 100–106 in that it has the same capabilities, but further includes internal modem capabilities so as to eliminate the need for modems 252B and 252C (used in the full line embodiment to provide the serial control signals to audio/video switches 108 and 110), are constructed so as to allow the local headend cable company to use the decompression capabilities of receiver 500 (usually supplied by the central site 1 owner) rather than having to invest in its own decompression system. In this dotted line embodiment, the local headend operator is provided with a combined receiver/modem/-control unit 502 for controlling the insertion of his own compressed local video/audio messages 504. Unit 502 can be controlled by the local operator, or in another embodiment can be controlled via signal 11 from remote central site 1. In either embodiment, the headend operator may use compressed audio/video messages in his own local message bank 504 without having to employ a separate decompressor unit of his own.

Returning now to the full line first embodiment illustrated in FIG. 2, the aforesaid decoder system in elements 100–106, such as the previously referenced. Model D9708 distributed by Scientific-Atlanta, Inc., may be of the same type of decoder system located at the remote site 1 as part of the encoder system as described above and used in its monitoring system (hereinafter described) including the parts as described for a four channel TDM decoder system (21.5 Mbps; 4 video, 16 audio) as listed. Downlink receiver 91B receives the network signals from the dedicated multidish arrangement 250 in RF frequency form and converts such signals into usable audio/video signals 50, 52, 54, 56, 58, 60, 62 and 64. Leading then into audio/video switches 108 and 110 are these aforesaid network signals, the serial control signals coming from modems 252B and 252C (e.g. Hayes-compatible modems), as well as the now decompressed commercial signals being sent for insertion as shown by the arrows emerging from the bottom of decompression/receivers 100, 102, 104, and 106. In this way, cable channel signals 50–64 can be viewed by cable television viewers and, upon receiving the coded control messages from the decompression/receiver devices 100, 102,104, and 106 (and the central signals from modems 252B and/or 252C), the audio/video switches 108 and 110 will switch in the commercial insert signals so that the commercial insert signals that have been sent from remote central site 1 are played over the local cable channels on lines 120, 122, 124, 126, 128, 130, 132, and 134 that are going to the TV cable customers. This arrangement thus results in any given cable channel signal having a remotely cued and broadcast commercial inserted, in real time, from a central uplink site 1 during a commercial "break" as cued by prior tone received from a given cable network signal (e.g. 242, 244, 246, 248, etc.).

A significant advantage of this embodiment of the present invention is that the expensive communications resource (i.e. the satellite and its transponders) is conserved and used to maximum effect at minimum cost. In this respect, efficiency is achieved through the recognition that the commercials to be inserted into a cable television signal by way of a "avail" during a commercial "break" can be time shared among a number of DMA regions or zones within a DMA.

In this respect, and as,shown schematically in FIG. 1, the satellite transponder 10 can downlink a coded commercial insert signal 2, useful in only certain areas. These areas may be DMA's themselves, or may be zones within a given DMA. For illustrative purposes, area 12 shall be designated as area "A" (Atlanta, Ga.). Area 14 shall be designated as area "B" (Boston, Mass.). Area 16 shall be designated area "C" (Chicago, Ill.), and area 18 shall be designated area "D" (Dallas, Tex.). Thus, for example, each of these downlink DMA's or zones can be a separate, major metropolitan area if desired. With the system of the present invention it is possible to selectively downlink a commercial insertion signal into each one of the four DMA areas or zones using an efficient sequencing concept in accordance with this invention.

Figure 3:
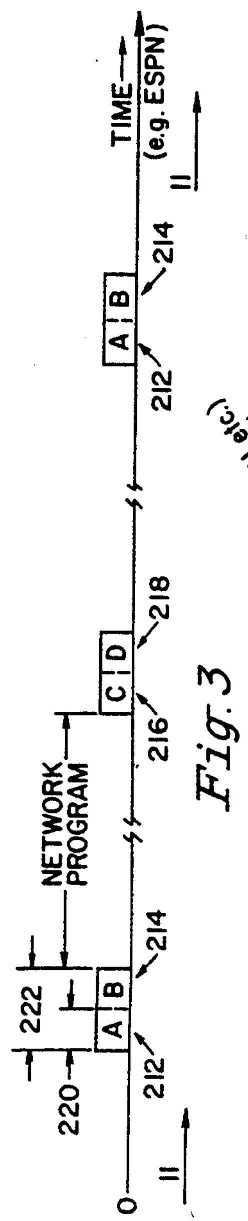
FIG. 3 is a diagram showing the time orientation of commercials to be inserted into available time slots for designated market areas according to an embodiment of this invention.

With reference now to FIG. 3, there is illustrated an embodiment of this time sharing (i.e. sequencing) concept. The block of time denoted by 222 is the full network (e.g. ESPN) "break" time allotted for insertions. The signal insertion is denoted as 212 and runs for the length of time 220. This is known as an "avail" in area A (Atlanta). Since an actual insertion 212 is taking place by way of receipt of a commercial from remote site 1 into area A, then this block of time 220 is termed an "avail". During that avail time, the other areas B–D will show some other commercial (either a local commercial, thus designated as a "local avail" or the commercial which the cable network is sending). In this instance, and in most situations contemplated, the time span 220 is shown as running about one-half or less of the entire "break" 222. The next sequential "avail" is for area B (e.g. Boston) and shows the insertion of the same or a different commercial by way of insert 214. The two blocks together consume substantially the entire amount of "break" 222. Of course, it is understood that when the insertion is taking place in area B, areas A, as well as C (e.g. Chicago) and D (e.g. Dallas) are free to run local ads by way of a "local avail" or allow the network ad to run.

Since avails A/B have consumed the entire "break" 222, cable network programming resumes thereafter and a new "avail" only occurs at the next designated "break". As shown, this next "break" is then consumed by two more "avail" insertions sequentially sent respectively to areas C and D (the commercials sent may be the same or different) and represented as insertions 216 and 218, respectively. As each insertion takes place in a given area (i.e. C or D) the other areas are freed up for local insertion or continued cable network commercials as aforesaid.

Following the second "break" and further resumption of network programming, the next "break" merely restarts the cycle again as among areas A, B, C, and D. In this way, as between four designated areas (DMA's or zones) each designated area only consumes one-fourth of the entire "avail" time being consumed in any given market area, freeing the rest of the time for local or network ads. It is to be understood that an "avail" may, in certain circumstances, consume an entire "break". Thus, sequencing of area "avails" actually results in the sequencing of entire area "breaks" in such a situation.

A typical example of a length of time for an entire "break" made available for second source insertion of commercials by the cable network company is 1–2 minutes. Typically the "avails" whether used by the remote source or by the local cable operator (headend), are for approximately 30 seconds in duration. It is, of course, understood in this respect that FIG. 3 illustrates the "breaks" being provided by a single network, here ESPN. The coordination of insertions into other network breaks is described below. It is also understood that spacing between the breaks is not necessarily the same, and, as especially occurs at times with ESPN, they may occur somewhat randomly, particularly during a sporting event such as baseball.

Figure 4:
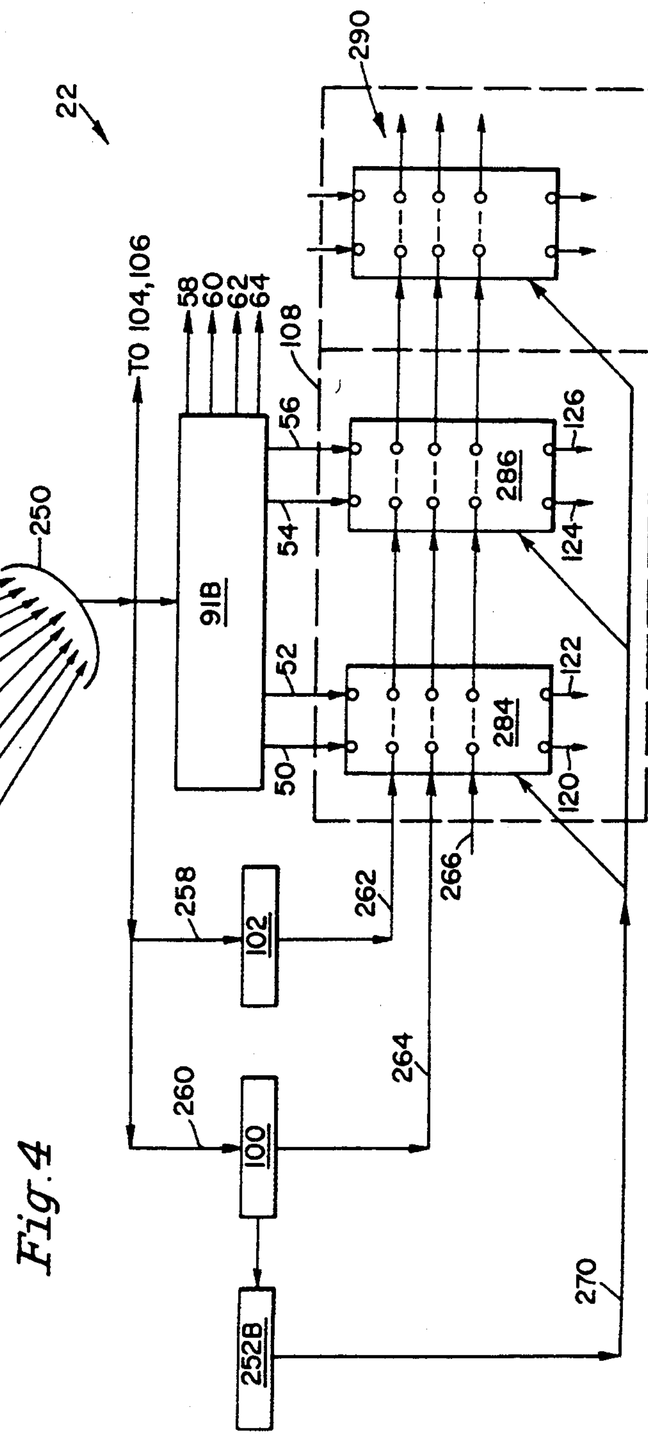
FIG. 4 is a diagram illustrating an embodiment of a signal processing and switching configuration at a cable headend site according to this invention.

With reference now to FIG. 4, the switching means at each cable headend 22 are more precisely, but still schematically illustrated. In this respect, and with brief reference to FIGS. 2 and 4 together, it is to be pointed out that receivers 91A and 91B are a bank of conventional receivers and cue tone detectors of known design (e.g. which not only detect the cue tone, but convert RF frequency to the usable video/audio spectrum. In addition, and with specific reference to FIG. 2, unit 90 is an RF up-converter of conventional design which, of course, creates from an audio/video spectrum signal an RF frequency beam for sending to the transponder in satellite 10.

Turning now to the schematic drawing of cable headend 22 as illustrated in FIG. 4, it can be seen that a number of signals (here nine, including signal 11) are being sent via various downlinks to a multiple array of standard dedicated dishes 250. Among these signals, of course, is the insertion signal 11, and the cable network signals 242, 244, 246, 248, etc., which are received in the downlink receiving satellite dish array 250. Signal 11 is the composite commercial insert signal (actually a stream of multiple commercials coming with coded instructions), of course, from the remote central site 1. Network signals 242, 244, 246, 248, etc. are, as described above, the regular cable network signals (CNN, ESPN, etc.) being received by both dish array 250 located at headend 22 and dish array 93 located at remote site 1 (FIG. 2). These network signals may be coming from the same or different satellites (not shown).

As shown now in FIG. 4, signal paths 258 and 260 carry the same commercial insert signal 11 being sent separately to signal decompression/RF conversion receivers 100 and 102. Receivers 100 and 102 are set to produce a first level of simultaneity (i.e. an audio/video commercial insert signal along path 262) and a second level of simultaneity (i.e. commercial insert video/audio signal 264). Signal path 262 transmits the first commercial message in the stream to run, and signal path 264 transmits the second commercial in the stream to run separately, simultaneously or in overlapping fashion (or vice versa). When the first commercial is complete, signal path 262 is freed up to transmit another commercial insertion (e.g. to another or the same network). Signal path 262 is thus aptly termed as the "first level of simultaneity" and signal path 264 is aptly called the "second level of simultaneity" because each may be inserted simultaneously into two different networks if desired. Two levels of simultaneity are used herein for four networks. Additional levels of simultaneity may be added with larger groupings of cable networks and switches.

Composite signal 11 includes, as aforesaid, a serial coded central message 270 for controlling switches 284 and 286 which insert into network signals 50–56 the commercials at the appropriate time. As further illustrated in FIG. 4, downlink composite signal 11 after its conversion in receiver 100, is sent to a conventional low speed (4800 baud) modem 252B (a Hayes-compatible modem) which then controls the audio/visual switches 284 and 286 (all as shown in FIG. 2 in combined form as switch 108) and thus the insertion process. Cable satellite network signals 242,244, 246, and 248 are received in the bank of receivers and cue tone detectors 91B (as aforesaid) and emerge as audio/video signals 50, 52, 54, and 56. Also emerging for sending to a similar bank of switches 110 are audio/video signals 58–64 which are, of course, the other four RF network signals (not numbered) which have come in to dish system 250. In this respect, then, the switching mechanism 108 and 110 will be handling for insertion eight network programmings. In response to coded control message 270, the audio/video switches 284 and 286 switch from the cable television signals 50, 52, 54, and 56 to one of the commercial insert signal paths 262 or 264. A similar function is duplicated, of course, in switch means 110 as illustrated in FIG. 2. This switching is accomplished and the resultant signal is output on customer cable lines 120, 122,124, and 126 (and for switch 110, lines 128–134). Additional advertising signals to be inserted may be accommodated as future growth dictates on a line such as shown as 260. Additional broadcast signals can then be switched for commercial insertion as shown in the redundant switch circuit 290. In this way, the cable headend configuration can be flexibly configured for future growth.

Figure 5:
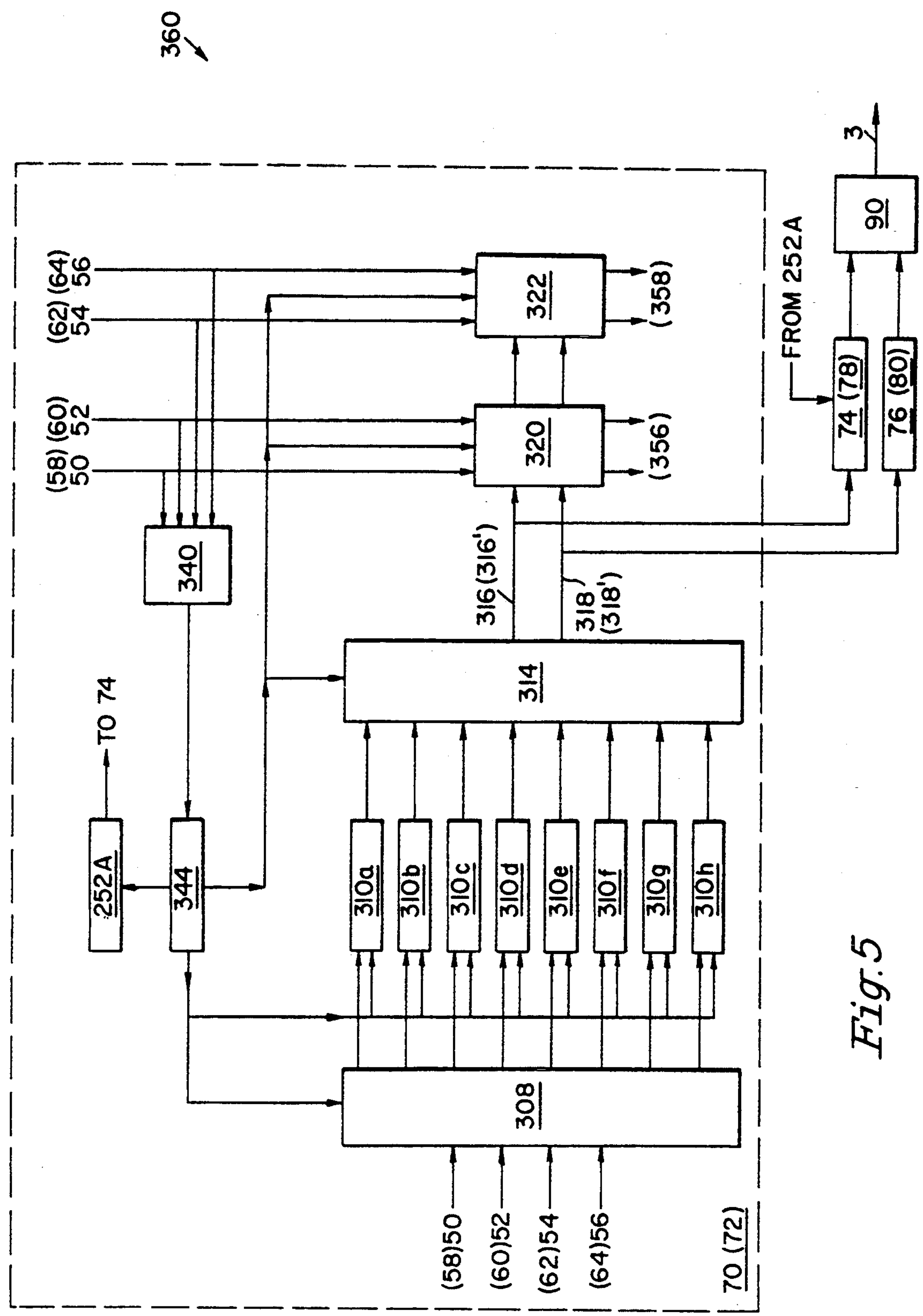
FIG. 5 is a diagram illustrating a configuration of a central remote site for broadcasting the stream of commercial insertion signals according to an embodiment of this invention.

With reference now to FIG. 5, there is illustrated an embodiment of insertion means 70 or 72 and its interrelationship with elements 74–80, up-converter 90, and decompressor/receivers 100–106 as more generally illustrated in FIG. 2. In this respect, and for reference purposes, it is here understood that central site 1 produces uplink signal 3 (see FIGS. 1–2) which includes the stream of commercials to be inserted. Signal 11, of course, is the transponded signal 3. At remote central site 1, the same cable satellite network signals are received as at headend 22 via dish systems 93 and 250, respectively. After passing through conventional cable receivers 91A and 91B (site 1 and 22, respectively) they become audio/video network signals 50–64. In this embodiment, elements 74, 76, 78, and 80 are individually dedicated to link only with their respective decompressor/receivers 100–106 at the headend, such that 74 is linked only to 100, 76 to 102, etc.. With reference to FIG. 5, signals 50–56 are received by insertion means 70, while signals 58–64 are received by insertion means 72.

The audio signals are monitored for industry standard cue tones which indicate the beginning of a cable commercial break (usually 5–8 seconds before the actual commercial break occurs). These cue tones, furthermore, in some networks may be standard sub-audio tones. A computer controller 340 detects the audio or sub-audio cue tones and provides a control signal 344 to control (via appropriate software) the switches and tape players 310*a–h* for commercial insertion system generally indicated as 360. Within computer/controller 340, whenever sub-audio tones are to be detected, there is provided a sub-audio tone detector such as a Wegener Model 1601 mainframe and control, for converting sub-audio tones to usable audio tones.

Signals 50, 52, 54 and 56 are also routed as video signals only to the tape players 310*a–h* for network synchronization, which are first input to video input synchronization system 308 (a set of relays coordinating network signals with tape decks 310*a–h*). This synchronization system 308, of known design, puts the video tape players 310*a–h* and, therefore, all of the stream of commercials to be inserted, "in synch" with the desired network so that the TV picture will not appear to roll when commercials are inserted.

The video synchronization system 308 provides an output signal which controls these video tape players 310*a–h* (which may be Sony VP7000's). An alternative to the use of video tape players 310*a–h* is to use a known digital storage and playback device. When tape decks are used they are preferably of one hour in length to contain 30-second commercials with 2-second gaps in between. Thus each tape may contain a little more than 100 individual commercials for insertion. Video tape players 310*a–h* (or alternative digital storage and playback device) in this way are capable of putting out a plurality of commercial signals in a stream, for insertion as controlled by audio/video coordination switch system 314. The output of the audio/video switch system 314 creates a level 1 simultaneity signal 316 and a level 2 simultaneity signal 318. Signal 316 and signal 318 are input to audio/video switches 320 and 322 (e.g. ARVIS 7742S switches) and are also used to drive compression-/encoding systems 74 and 76. An example of a unit which includes elements 340, 344,308, 314, as well as the monitoring system 320/322 (hereinafter described) is an ARVIS 7240 purchasable from the ARVIS Corporation. Compression systems 74 and 76 feed the signals so received, as well as the signal received from modem 252A into up-converter 90 which, via uplink dish 95

(FIG. 2) then creates composite commercial stream signal 3 to satellite transponder 10. It is understood, of course, that insertion device 72 is a duplicate of 70, and, as shown in parentheses handles signals 316' and 318' for insertions into network signals 58–64.

In addition to sending the converted network signals 50–64 through the switch mechanism as previously described, insertion mechanism 70 and 72 also include means for monitoring the uplink signal being sent for accuracy. For this purpose switch means 320 and 322 are provided so as to generate a monitoring system. In this respect, switches 320, 322 provide output signals 356 and 358, respectively, to video and audio monitors for purposes of monitoring for quality and accuracy the insertion taking place at the uplink site.

Figure 6:
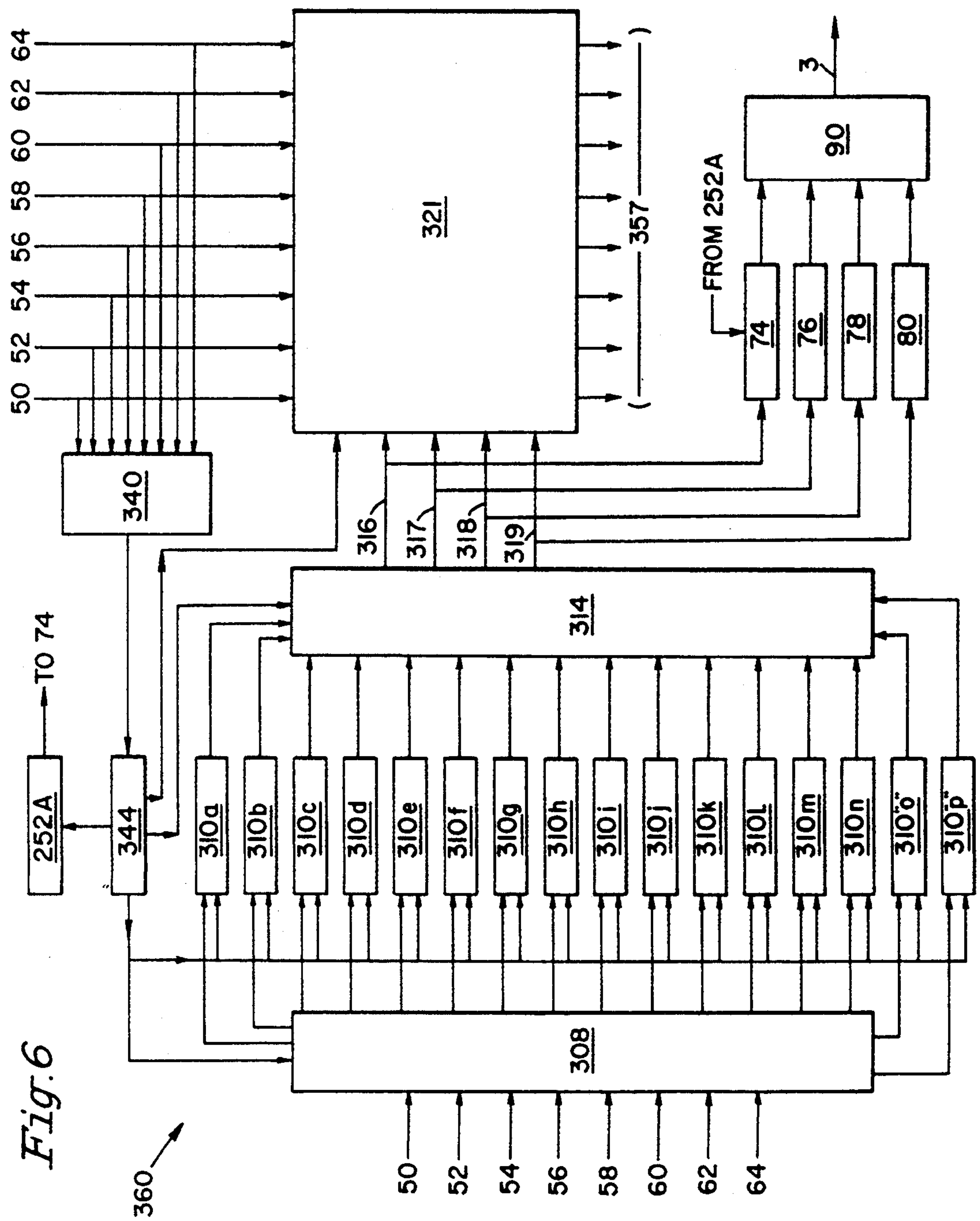
FIG. 6 is a diagram illustrating another signal processing and switching configuration at a cable headend site according to this invention.

With reference now to FIG. 6, there is illustrated another embodiment contemplated by this invention of a switching matrix for creating the insertion of commercials. In this embodiment switch means 108, 110 (FIG. 2) are combined into a single switching matrix. In the embodiment as illustrated in FIG. 4, in this respect, the separate switch matrix 108 and 11.0 accommodate, in each, two levels of simultaneity. Thus, each switch matrix 108 or 110 can accommodate only two commercials at one time, on four networks. In the embodiment of FIG. 6, on the other hand, where matrixes 108 and 110 are combined, four channels may be accommodated for overlapping commercial breaks on eight networks. This later embodiment is thus statistically more efficient and should be used wherever demand so justifies.

In order to achieve this increased efficiency, and with specific reference to FIG. 6, the number of tape players has been increased from eight to sixteen, and now includes tape players 310*a–p*. As can be seen, the system is generally the same as that illustrated and described above with respect to FIG. 5, except that switch 314 now outputs four levels of simultaneity 316, 317,318, and 319, which are also used to drive elements 74, 76, 78 and 80. The output monitoring switch 321 is an expanded matrix switch that inserts four levels of simultaneity into all eight cable networks and creates monitoring signals 357. Monitoring may also be accomplished, if desired, by locating at the remote site 1 (or at any monitoring site) another system 22 (i.e. a monitoring headend). By using both monitoring systems, both the uplink signal and customer signal are monitored. Further expansion to sixteen, or more, networks may be made in a similar fashion by merely reconstructing further additional mechanisms in the same way that FIG. 6 increases over FIG. 5.

Another unique feature of this invention, due to its real time nature that allows for monitoring at any site merely by creating another downlink system 22 that monitors all areas being serviced, is that the need for numerous affidavits of performance may be eliminated. This is accomplished by merely establishing as the monitoring site 22 an independent verification service such as A. C. Nielsen Corp. (a division of Dunn & Bradstreet Corp.) which then need provide only a single verification of performance to the required parties if requested.

From the above, it can be seen that the present invention presents to the art for the first time a very efficient and unique method and apparatus for inserting the same or different commercials into different areas. At a central site 1, the cable network signals are monitored for tones which signal the breaks, so that inserted commercials can create "avails" therefrom. Upon detection of the cues for the breaks, avails may be simply and efficiently created at the remote site in which commercials may be inserted by efficient use of a satellite transponder 10. All of this can be done without interfering with the ability of the local cable operator to insert where desired local advertising which he has been able to obtain to help support his local cable company.

With reference, in this respect, to the uplink signal 3, there is included therein an addressable coded control message and a plurality of commercials in a stream to be inserted. The switches at each headend contain an addressing feature, so that they only respond to commands with their address when received. The commercials are time shared, then, in sequencing fashion among a plurality of designated market areas or zones (or other form of different designee), such as those as illustrated in FIG. 1. Each of the cable headend units 22 in a given designated DMA or zone within a DMA, receive its designated commercial insert signal. The commercials are time shared such that only one of the designated areas shows the inserted commercial at a time on any particular network. In this way, the transponder resource 10 is conserved and, as hereinbefore described, one transponder can be used to serve a plurality of DMA's or zones.

For example, one market area or zone is chosen for receiving a specific commercial insert signal. That designated area and the cable headend units within it will then receive the coded control message to control audio/video switches 284, 286, FIG. 4 (also shown as 108 in FIG. 2) at each headend. The audio/video switches are switched to allow signals 316–319 (or 316, 318, 316', 318' in FIG. 5) to be inserted in real time into the local cable system during the chosen "avail" for each cable network. The commercial chosen need not be the same for each avail or each sequence, since through control means 344 and the bank of tapes containing numerous commercials, commercials may be selected from each tape and/or from each tape deck 310*a–p* for insertion in the appropriate fashion.

Figure 7:
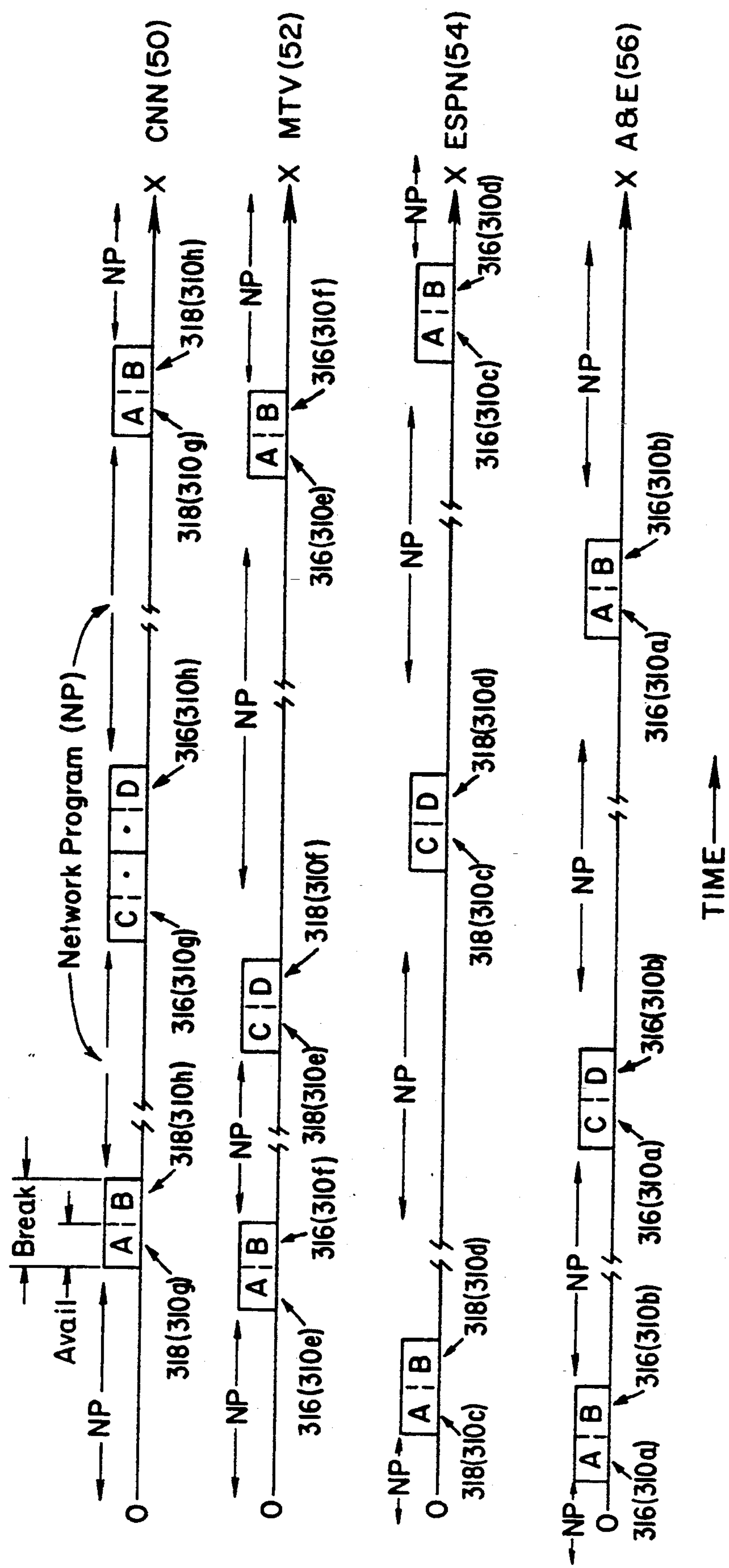
FIG. 7 is a diagram showing a time oriented insertion scheme as contemplated by this invention.

The permutations and combinations are numerous, all of which are contemplated by this invention. However, in order to demonstrate both the efficiency and uniqueness of the subject invention, there is presented in FIGS. 7 and 8 an illustration of two sequencing embodiments as contemplated by this invention. With reference first to FIG. 7 there is illustrated an embodiment wherein there is created by the remote site 1, two levels of simultaneity for commercial insertions into four networks' breaks. This, for example, would simulate a typical use contemplated for insertion device 70. Device 72 would be a duplicate, but for four other networks.

As shown in FIG. 7, four networks; namely, CNN, MTV, ESPN, and A&E are presented for insertion of commercials during a series of three breaks over a finite period of time running from 0 to X. As can be seen in each of these four networks, commercial breaks appear at different times, but both commercial breaks and avails as between the networks may at times overlap. In this embodiment the breaks and networks are chosen so that no more than two network's breaks (and avails) overlap. That is because there are only two levels of simultaneity being generated. The two levels of simultaneity being generated are, as illustrated for example in FIG. 5, signals 316 and 318.

FIG. 7 contemplates the servicing (insertion) of four DMA's or zones labeled A, B, C, D, respectively. The arrows entering the blocks A, B, C, D indicate insertions of a commercial selected from a plurality of commercials in the indicated tape deck 310*a–h*. The designation "NP" designates network programming occurring between breaks. Using, for example, the contrast between A&E and ESPN (i.e. signals 56 and 54, respectively) it can be seen that the first break occurs at A&E. That break, usually one minute in duration, is separated into two, equal 30-second "avails". Into the first avail there is inserted in area A (e.g. Atlanta) the first level of simultaneity signal 316 which has selected from tape deck 310*a* a specific commercial for insertion. Overlapping this A&E break is the first ESPN break which again is separated into two "avails". Despite the fact that a commercial is running in area A on A&E from tape deck 310*a* via signal 316, the system creates, through simultaneity in signal 318, the selection of another commercial from tape deck 310*c* for play into area A on the ESPN network. Then, when the first "avail" is finished in area A on the A&E network, tape deck 310*a* is freed and tape deck 310*b* is cycled into signal 316 to play the same or a different commercial into area B (Boston) on A&E.

The first "avail" on A&E is mot being used in areas B (Boston), C (Chicago), and D (Dallas), while being used in area A. These other areas are then freed up at their headends to insert their own local commercials at that time in the first "avail" on A&E, or to allow the A&E network to run its national advertising being sent by way of its signal 56.

By simply following the diagram presented in FIG. 7 in its logical sequencing, and in accordance with the way just described with respect to the contrast between A&E and ESPN, as well as the sequencing of areas A, B, C, and D, it can be seen that four commercial networks are efficiently serviced during their breaks by two levels of simultaneity with a large number of available commercials recorded on eight tape decks, each tape deck capable of storing more than 100, 30-second commercials.

Figure 8:
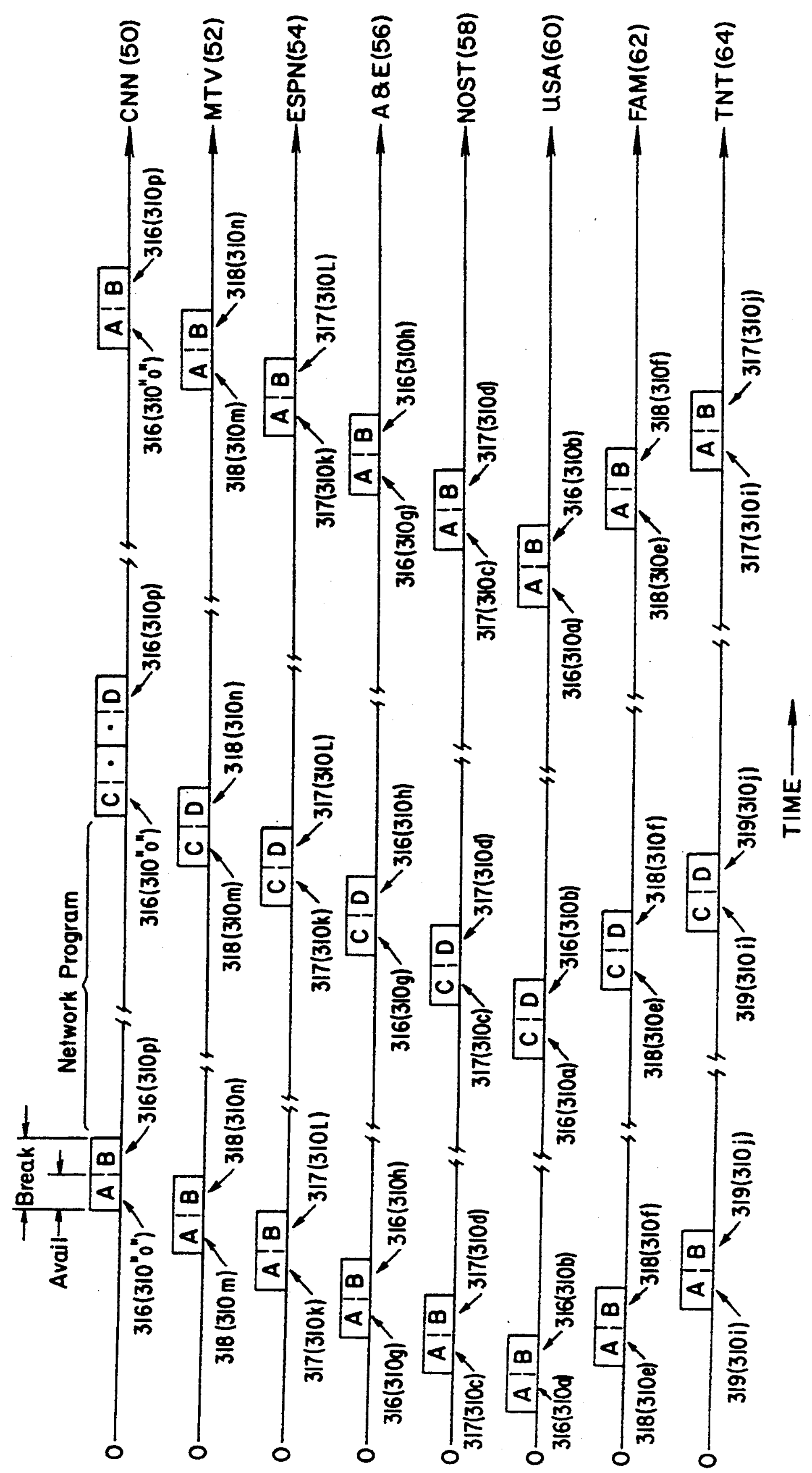
FIG. 8 is a diagram showing another time oriented insertion scheme as contemplated by this invention.

FIG. 8 illustrates a similar situation, but in the instance reflected in the system shown in FIG. 6, where four levels of simultaneity via signals 316, 317, 318, and 319 are built into the system. Here, eight networks are serviced during their breaks and four network overlaps in their breaks and/or avails may be accommodated due to the four levels of simultaneity built into the system. In this instance, as aforesaid, instead of using the eight tape decks as presented in FIG. 5, sixteen tape decks are now employed to give even more opportunity for selecting among an even larger number of recorded commercials. In this respect, it is to be noted that the commercials are conveniently stored in a single system at the remote central site 1, rather than having to store them at each headend site as in certain former prior art systems. The elimination of storage facilities (other than any storage facility desired by the local headend to store its own local commercials) is a significant advantage of this system over certain known prior art devices. By following through, in this respect, the same logical progression of breaks and avails as described with respect to FIG. 7, all as illustrated in FIG. 8, the efficient servicing of eight cable network channels can be seen to be achieved.

A comparison of FIG. 5 with FIG. 6 and FIG. 7 with FIG. 8 illustrates some important differences between the two embodiments illustrated. First of all, it is to be understood, as aforesaid, that FIG. 7 illustrates the commercial inserting being generated only by insertion means 70 in FIG. 2. Insertion means 72, as illustrated in the parenthesis, would be generating its own two levels of simultaneity 316′ and 318′ for insertion into networks 58–64 using elements 78 and 80. Thus, in this respect, the embodiment of FIG. 5 does create four levels of simultaneity and services eight networks when duplicated insertion means 72 is taken into account (i.e. FIG. 7 is mirrored again for element 72). However, in this embodiment each level of simultaneity only has eight tape decks to choose commercials from, and then it can only service a grouping of four networks. Thus, as shown in FIG. 7, insertion means 70 could service CNN, MTV, ESPN and A&E, while insertion means 72 could service NOST, USA, FAM and TNT. In each of these groupings, only two levels of simultaneity can be tolerated. Thus if in either of these two groupings of four networks, for example, one grouping had more than two overlaps in commercial breaks or avails (in other words requiring more than two levels of simultaneity within a grouping), the embodiment of FIG. 5 could not accommodate it even with both insertion means 70 and 72 operating to their fullest capacity.

In comparison it can be seen that the embodiment of FIG. 6 (and FIG. 8) overcomes this limitation because all eight networks are grouped together and are being serviced in the same switching mechanism which creates, instead of two pairs of signals each with two levels of simultaneity, four non-paired signals with four levels of simultaneity. The result is that the grouping of networks now becomes statistically more efficient since four overlaps can be accommodated, rather than only two. In addition, all four levels appropriate control, select from all sixteen tape decks, rather than being limited to only eight tape decks. Thus a degree of flexibility is built in to the embodiment of FIG. 6 that is not present in the embodiment of FIG. 5. However, in both embodiments a significant improvement over the prior art is achieved. This is particularly true when compression systems are employed as aforesaid to conserve transponder channel use and thus create further efficiency.

Once given the above disclosure, many other features, modifications and improvements will become apparent to the skilled artisan. Such other features, modifications and improvements are therefore considered to be a part of this invention the scope of which is to be determined by the following claims:

We claim:

1. A system for inserting addressed, additional television signals into network television signals emanating from a source and being received by at least two receiver systems which include switch means responsive to an address signal associated with said additional television signals for allowing said addressed additional television signals to be inserted into said network television signals, said source of said network television signals being located separate from said receiver systems, said system for inserting said additional television signals comprising a source of said additional television signals located separate from both said source of said network television signals and said receiver systems, and wherein said source of additional television signals comprises:

a) means for sensing a cue signal associated with said network television signals, said cue signal designating an upcoming time interval within which a said additional television signal from said source of additional television signals may be inserted;

b) means for generating one or more additional television signals capable of being inserted into said time interval after said sensing means senses said cue signal associated with said time interval;

c) means for associating with each said additional television signal to be inserted a selective address signal such that each said additional signal may be addressed to activate for insertion said switch means in one or more said receiver systems;

d) means responsive to said cue signal for sending at least one of said additional television signals and said selective address signal associated therewith so that when received at said receiver systems, said address signal will activate for insertion of said additional television signal said switch means in at least one, but not all, said receiver systems.

2. A system according to claim 1 wherein said source of additional television signals further includes satellite dish means for receiving a plurality of network programs which include the said cue signal, and uplink means for generating an uplink signal via satellite of the additional signal to be inserted and said selective; address signal; and wherein said receiver system includes satellite dish means for receiving at least the same plurality of network programs which includes the said cue signal as received by said source dish means and for receiving a downlink signal of said additional signal to be inserted and said selective address signal from a satellite generated in response to said uplink signal from said source.

3. A system according to claim 1 wherein said sending means includes means for sequentially sending a said additional television signal each sequential sending having associated therewith a different selective address signal.

4. A system according to claim 3 wherein said sending means includes means for sending at least two additional television signals each associated with a different address signal in sequence during the same time interval.

5. A system according to claim 4 wherein:

said sensing means includes means for sensing a cue signal associated with a network television signal from at least two separate network sources being received by said receiver systems, each said cue signal designating an upcoming time interval associated with its respective network television signal within which a said additional television signal may be inserted from said source of additional television signals;

said sending means responsive to said cue signals including means responsive to a said cue signal associated with at least said two network television signals for sequentially sending in response to both said cue signals said additional television signals to said receiver systems, each sending having associated therewith a different address signal from the previous sending.

6. A system according to claim 5 wherein said time intervals of said at least two network television signals overlap in time.

7. A system according to claim 5 wherein said time intervals are commercial breaks.

8. A system according to claim 7 wherein said commercial breaks of said at least two network television signals occur simultaneously.

9. A system according to claim 7 wherein said additional television signals to be inserted are television commercials, said system further including a storage means containing a plurality of said commercials and control means for selecting from said storage said commercials for addressing and sending to said receiver systems.

10. A system according to claim 5 wherein said means responsive to said cue signals includes means responsive to a said cue signal associated with each of at least four television network signals.

11. A system according to claim 1 wherein said source of additional television signals further includes means for compressing said additional television signals, and said receiver system includes means for decompressing said compressed signal received for insertion from said source of additional television signals.

12. A system according to claim 11 wherein said decompression means located at said receiver system in addition to being capable of decompressing said addressed compressed additional television signals received from said source thereof, is further capable of decompressing a compressed signal received from another source and wherein said receiver system further includes storage means for storing at least one compressed signal after decompression and control means for removing from said storage said stored, decompressed signal received from said another source and inserting said stored signal into said time interval at a time not used by the insertion of said additional television signal received from said source thereof.

13. A method for inserting addressed, additional television signals into network television signals emanating from a source and being received by at least two receiver systems which include switch means responsive to an address signal associated with said additional television signals for allowing said addressed additional television signals to be inserted into said network television, said source of said network television signals being located separate from said receiver systems, said method for inserting said addressed, additional television signals being initiated from a source of said additional television signals located separate from both said source of said network television signals and said receiver systems, and wherein the steps carried out by said source of said additional television signals comprise:

a) sensing a cue signal associated with said network television signals, said cue signal designating an upcoming time interval within which a said additional television signal from said source of additional television signals may be inserted;

b) generating one or more additional television signals capable of being inserted into said time interval after said sensing a said cue signal associated with said time interval;

c) associating with each said additional television signal to be inserted a selective address signal such that each said additional television signal is addressed to activate for insertion said switch means in one or more said receiver systems; and d) sending in response to said cue signal at least one said additional television signal and said selective address signal associated therewith so that when received at said receiver systems, said address signal will activate for insertion of said additional television signal said switch means in at least one, but not all, said receiver systems.

14. A method according to claim 13 which includes the further steps conducted by said receiver systems:

a) receiving a said network television signal;
b) receiving said additional television signal and said selective address signal associated therewith;
c) activating said switch means in each respective receiver system associated for activation by the said address signal, and not activating said switch means in each respective receiver system not associated for activation by said selective address signal; and
d) inserting said additional television signal within the said time interval in said network television signal only at those receiver systems whose switches were activated by said selective address signal.

15. A method according to claim 14 wherein said time interval is a commercial break and said additional addressed signals for insertion are commercials; wherein said one or more additional television signals each do not consume more time than said time interval; and wherein said one or more additional television signals are sequentially sent within said time interval, each said additional signal being accompanied by a different selective address signal so as to activate a different headend switch or group of headend switches from the other said additional signal preceding it in the sequence.

16. A method according to claim 14 wherein said sensing step includes sensing a cue signal associated with a network television signal from at least two separate sources being received by said receiver systems, each said cue signal designating an upcoming time interval associated with its respective network television signal within which a said additional television signal may be inserted from said source of additional television signals;

wherein said generating step includes generating a plurality of said addressed additional signals each of which consumes less time than said time interval into which it is to be inserted, said method further including the steps comprising:

selecting from said plurality of additional signals at least two different additional signals, each accompanied by a different selective address signal to be sequentially inserted into a said time interval of at least two said networks;

sequentially sending in response to a cue signal from each of at least two said network signals for insertion into the time interval of each of said at least two said network signals said two additional television signals, each accompanied by its respective different selective address signal; and inserting sequentially into each said time interval of at least said two networks said additional signals only at said receiver systems whose switch means is activated by said selective address signal.

17. A method according to claim 16 wherein said time intervals of said at least two network television sources overlap in time.

18. A method according to claim 17 wherein said time intervals of said at least two network television sources occur simultaneously.

19. A method according to claim 17 wherein there is sensed for insertion cue signals from at least four different television network sources, at least two of said time intervals thereof overlap in time.

20. A method according to claim 13 wherein said method as carried out at said source of additional television signals further including prior to sending said additional television signals, compressing said additional television signals, and said method as carried out at said receiver systems which insert said additional television signals, decompressing said compressed additional television signals after receiving said signals for insertion.

21. A method according to claim 20 wherein said method carried out at said receiver systems further includes decompressing a further signal received from a source other than said source of additional television signals and inserting said further signal into said time interval at a time not used by the insertion of said additional television signal.

22. A method according to claim 20 wherein said compression and decompression are in a ratio of at least 4:1 and 1:4, respectively.

23. A method according to claim 13 which includes the further step of monitoring from a central site the sending of said insertion signals and verifying whether or not each intended insertion signal was sent to its intended receiver system for insertion.

24. A method of inserting at least one commercial message from a remote source into at least one pre-cued break in ongoing television network programming being received by at least two receiver systems from at least one network source separate from said remote source and said receiver systems, each said receiver system being separate from the other and having therein a switch means for allowing insertion of said commercial message only in response to receipt of an address signal pre-selected to activate that said switch means, at least one said switch means being activated only by a different pre-selected address signal than the other said switch means, the steps including:

a) creating an address signal for activating at least one, but not all, of said switch means at said receiver systems;
b) sensing at said remote source a cue signal generated by said network source for indicating an upcoming break into which a commercial message may be inserted;
c) sending from said remote source to said receiver systems in response to said sensing of said cue signal, a commercial message and a said pre-selected address signal;
d) activating only the switch means in those said receiver systems associated with the said pre-selected address signal; and
e) inserting said commercial message into said pre-cued break only at those receiver systems whose switch means were activated by said pre-selected address signal.

25. A method according to claim 24 wherein said commercial messages consume less than one-half of said pre-cued break, and said method further includes:

a) creating at least two different address signals for activating at least two different said switch means;
b) sequentially sending at least twice during said pre-cued break a said commercial message from said remote source to said receiver systems; and
c) sending a different address signal in association with each sequential sending of a said commercial message from the previous sending of a said commercial message;

whereby a said commercial message is inserted sequentially at least twice into the said commercial break, each said sequential insertion occurring at a different receiver system or group of receiver systems from the previous insertion.

26. A method according to claim 25 wherein said sequencing of commercial messages involves at least two different commercials.

27. A method according to claim 25 wherein said receiver systems are geographically separated headend systems.

28. A method according to claim 27 wherein said headend systems are cable television systems, each of which transmits to a plurality of subscribers said television network programming.

29. A method according to claim 55 wherein said network programming includes programming being sent by at least two network sources to said receiver systems, each said network source generating a cue signal indicating an upcoming break into which a commercial message may be inserted, the method further including:

a) sensing at said remote source the said cue signals of said at least two networks; and b) said sequentially inserting at least twice into each of said at least two networks' break a said commercial message, each said sequential insertion in a said network's break occurring at a different receiver system or group of receiver systems from the previous insertion.

30. A method according to claim 29 wherein at least one said break of a said network overlaps in time with a said break of another network, and said sequential insertion of a said commercial message occurs in overlapping time relationship during said overlapping breaks.

31. A method according to claim 30 wherein said overlapping breaks occur simultaneously.

* * * * *